United States Patent [19]
Mezzatesta, Jr. et al.

[11] Patent Number: 5,349,276
[45] Date of Patent: Sep. 20, 1994

[54] CONTROL SYSTEM FOR REGULATING MOTOR SPEED

[75] Inventors: Frank Mezzatesta, Jr., Glendale; Donald M. Young, Los Angeles, both of Calif.

[73] Assignee: The Walt Disney Company, Burbank, Calif.

[21] Appl. No.: 54,541

[22] Filed: Apr. 27, 1993

Related U.S. Application Data

[62] Division of Ser. No. 843,604, Feb. 28, 1992.

[51] Int. Cl.⁵ ............ H02P 5/00; H02H 7/08; G01P 3/48
[52] U.S. Cl. .................. 318/268; 318/434; 318/464; 388/903; 388/909
[58] Field of Search ............ 318/565, 652, 653, 640, 318/647, 463, 254, 590, 602, 618, 135, 138, 139, 268, 271, 272, 434, 439, 464, 490, 494, 495, 496; 388/809, 814, 816, 820, 903, 907.5, 909

[56] References Cited

U.S. PATENT DOCUMENTS

| | | |
|---|---|---|
| Re. 32,857 | 2/1989 | Luneau . |
| 1,438,616 | 12/1922 | Staege . |
| 3,757,183 | 9/1973 | Nola . |
| 3,916,272 | 10/1975 | Grunleitner et al. . |
| 3,969,659 | 7/1976 | Thode . |
| 4,078,189 | 3/1978 | Nash et al. . |
| 4,208,621 | 6/1980 | Hipkins et al. . |
| 4,228,396 | 10/1980 | Palombo et al. . |
| 4,292,577 | 9/1981 | Cesarz et al. . |
| 4,305,025 | 12/1981 | Arnold . |
| 4,386,398 | 5/1983 | Matsuoka et al. . |
| 4,449,082 | 5/1984 | Webster . |
| 4,492,902 | 1/1985 | Ficken et al. . |
| 4,570,110 | 2/1986 | Bloom et al. . |
| 4,572,999 | 2/1986 | Coulon, Jr. . |
| 4,686,437 | 8/1987 | Langley et al. . |
| 4,712,050 | 12/1987 | Nagasawa et al. . |
| 4,942,344 | 7/1990 | Devitt et al. . |
| 5,015,927 | 5/1991 | Reichard . |
| 5,028,852 | 7/1991 | Dunfield . |
| 5,076,399 | 12/1991 | Horbruegger et al. . |

Primary Examiner—Bentsu Ro
Attorney, Agent, or Firm—Pretty, Schroeder, Brueggemann & Clark

[57] ABSTRACT

A motor control system accurately and reliably controls the speed of a motor so that the motor operates in accordance with a predetermined motor speed profile, and therefore does not exceed a predetermined safe speed, decelerates at a controlled rate, maintains a safe minimum speed, and does not turn in reverse. If the motor operates out of these limits, a malfunction is indicated and the control system halts operation of the motor. The motor speed is determined using an electronic tachometer that analyzes the current in at least two phases of the motor to provide extremely precise and reliable velocity information for the motor.

20 Claims, 4 Drawing Sheets

CONTROL SYSTEM FOR REGULATING MOTOR SPEED

This application is a division of a currently pending application, application Ser. No. 07/843,604, filed on Feb. 28, 1992.

BACKGROUND OF THE INVENTION

1. Field of the Invention

This invention relates generally to control systems for motors and, more particularly, to motor control circuits that keep the speed of a motor within a predetermined range.

2. Description of the Related Art

It often is important to control the speed of a motor with precision and reliability. Controlling the speed of a motor is especially important when the motor is used to operate machinery that could cause injury if the motor malfunctions. For example, if the motor is used to propel an amusement ride vehicle that carries passengers, a very specific motor speed profile must be followed with virtually no tolerance for error. In such an application, passengers can be injured if the motor speed increases during the ride such that the vehicle exceeds the specified speed. Conventional motor control systems can adequately limit motor speed, but are not sufficiently reliable to provide the virtually error-free matching of actual motor speed to the desired motor speed profile, such as ramping the speed up or down, that also are particularly important in the case of motors that propel ride vehicles.

Passengers can be injured if the actual motor speed does not reach the speed required in the profile, because the vehicle could have insufficient speed to safely negotiate the ride course. The actual motor speed also must follow the deceleration profile. For example, passengers can be injured if the motor allows the vehicle to speed up when the passengers are preparing to enter or exit the vehicle. Finally, the actual motor direction must propel the ride vehicle in the direction commanded by the profile, so that the vehicle is not moved in reverse when a forward motion is expected. The result of any of these improper motor operations can be catastrophic. Thus, the actual motor operation must match the motor speed profile. Many motor control systems cannot control the actual motor operation with the extreme reliability demanded for amusement park rides.

Various malfunctions can cause the actual motor speed to vary from what the commanded motor drive signals dictate, or can cause the drive signals to be different from the signals that should be provided. A motor control system is used to regulate the actual motor performance so that the actual speed matches the speed profile or at least so that the motor is shut down if the actual speed does not match. Effective motor control systems should include a means for obtaining reliable and accurate motor speed information that is easily integrated with the drive VFD. It is especially important to have accurate and reliable motor speed information if the motor is to be incorporated into a ride vehicle.

Conventionally, the actual speed of a motor is usually determined by attaching a tachometer to the shaft of the motor. A mechanical tachometer includes a mechanism that is rotated by the shaft and thereby indicates the motor's speed. The indicated speed is used to control the application of driving electrical power to the motor. The motor speed data is relatively easy to integrate with the control system, but the mechanical tachometer can become unreliable as various parts wear out. An electronic tachometer should provide greater reliability than a mechanical tachometer, and lends itself to integration with electronic motor drive systems. Such a tachometer, for example, can derive a speed signal by measuring the frequency of the motor current.

From the discussion above, it should be apparent that there is a need for a motor control system that can monitor and regulate motor performance with comparable accuracy and a higher degree of reliability than is achieved conventionally, and that can be much more easily incorporated into a motor drive system for control of the motor speed. The present invention satisfies this need.

SUMMARY OF THE INVENTION

A motor control system in accordance with the present invention reliably monitors the actual motor speed, compares it against a motor speed profile, and produces command and speed monitor signals that indicate motor performance. The control system includes a tachometer that indicates the speed of the motor and a variable frequency drive (VFD) that produces drive signals for the motor. The command and speed monitor signals are generated according to the speed called for by the speed profile and the motor speed. The control system uses the command and speed monitor signals to check for failure to operate in accordance with the speed profile by checking for the occurrence of particular combinations of signals that are not expected if the motor is properly following the speed profile. If an unexpected combination persists beyond an acceptable time period that depends on the particular combination, then the control system indicates a failure and halts operation of the motor. In this way, the control system ensures that the motor operates in accordance with the motor speed profile. The required signals can be produced by relatively simple circuitry, and a control system incorporating such signals is easily integrated with, for example, the drive system that is needed for a pulse-width modulation motor.

The speed monitor signals represent the actual motor speed in relation to the motor speed profile and indicate when the actual motor speed is within acceptable error bounds. The command signals command the VFD to change the speed of the motor or halt the motor altogether. Self-checking is designed into the control system by selecting the speed monitor and command signals and by selecting the combinations of signals to be checked such that the state of the signals will change at least once during the motor speed profile and such that at least two different signals must be checked to indicate proper functioning at any point in the speed profile. In this way, false indications of malfunction are avoided and virtually all possible error scenarios are detected.

By checking various combinations of the speed monitor and command signals, it is possible to reliably check for failure modes, quickly determine the nature of a failure, and avoid false failure indications. For example, the speed monitor signals and command signals are selected to be either high or low. Speed monitor signals can be established that are high when the speed of the motor is above a minimum that constitutes full speed, below a safe maximum speed, or within acceptable error bounds for the deceleration rate, and that are low otherwise. Similarly, command signals can be established that are high when power should be applied to the motor, when the motor should operate at full speed, or when the motor should be stopped, and are low otherwise.

Proper operation of the motor is indicated by the intersection of signal values. For example, if the minimum full speed signal is high and the safe maximum speed signal is low, then the motor is running overspeed. If the VFD has been commanded to generate drive signals to operate the motor at full speed and the minimum full speed signal is low, then the motor has failed to reach full speed. To avoid false failure indications, each possible failure combination is assigned a time limit. If a combination of signals indicates a failure, then the condition must exist for at least the assigned time limit before operation will be halted. The time period for each failure combination is restarted each time the error condition ceases.

A motor control system in accordance with the invention also advantageously determines the rotational speed and direction of the motor by using an electronic tachometer that senses the current in at least two poles of the motor, removes the high-frequency components of the sensed current signals, and provides a signal that indicates the fundamental frequency of the sensed currents and therefore the speed and direction of the motor. The motor speed can therefore be monitored and controlled electronically without the reliability and maintenance problems associated with mechanical tachometers and with comparable accuracy. Such electronic speed determination is relatively simple to construct and is easily integrated into the drive system of a motor.

The frequency of the sensed currents can be provided by current sensors attached to each one of the phase leads attached to the motor. The sensed current signals can be filtered by a low-pass filter that removes substantially all frequency components greater than the maximum expected operating speed. The pulsed signal that indicates the frequency of the filtered current signal can be provided by a zero crossing detector that produces a low to high or high to low transition at each zero crossing of the filtered current signal. All of these components can be easily obtained and incorporated into a motor control system.

Other features and advantages of the present invention should be apparent from the following description of the preferred embodiments, which illustrate, by way of example, the principles of the invention.

DESCRIPTION OF THE PREFERRED EMBODIMENTS

Figure 1:
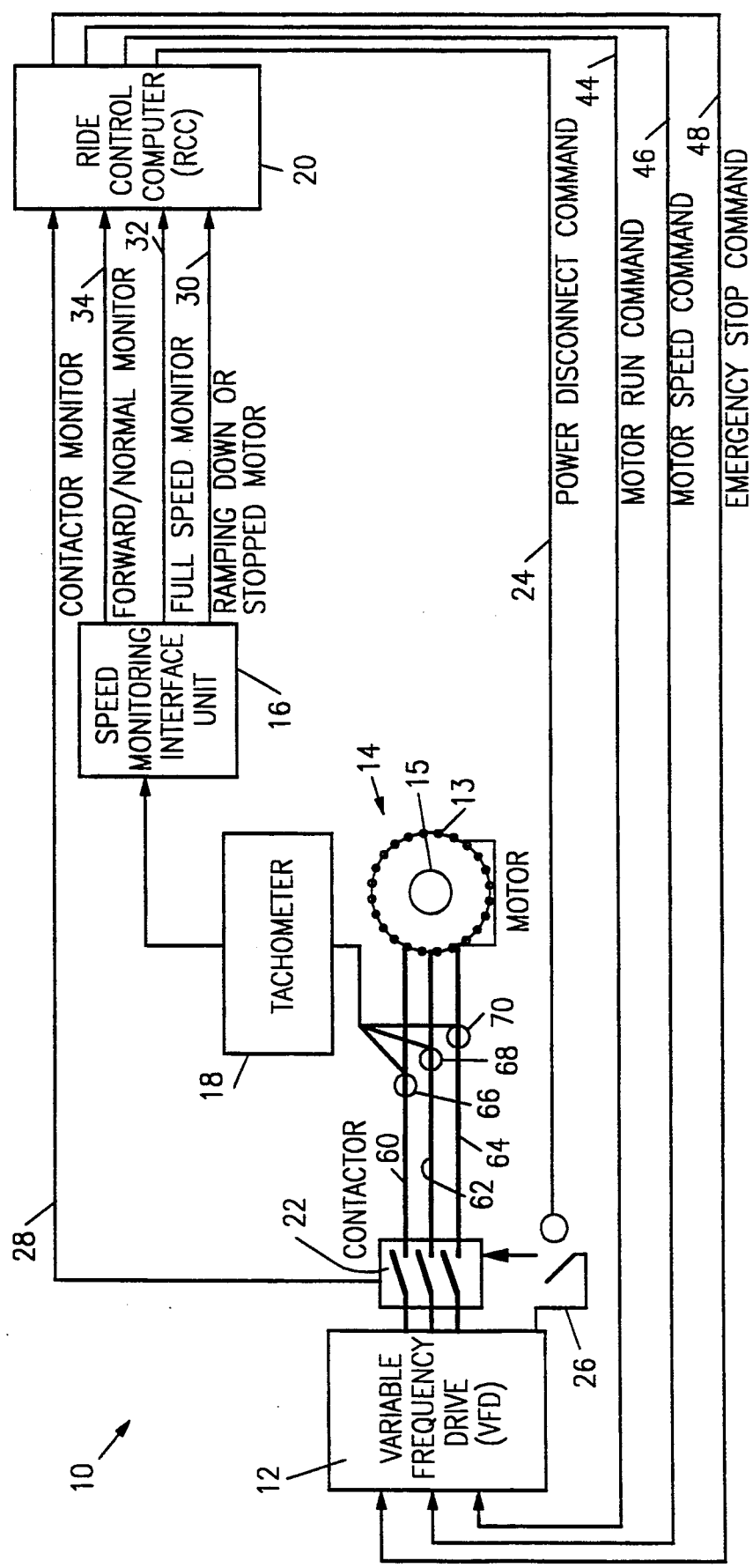
FIG. 1 is a block diagram of a motor control system constructed in accordance with the present invention.

With reference to FIG. 1, a motor control system 10 constructed in accordance with the present invention includes a variable frequency drive signal generator 12 (VFD) that provides a sequence of drive signals to each phase of a motor 14 and a speed monitoring interface unit 16 that receives speed data from a tachometer 18 and provides speed monitor signals to a ride control computer 20 that, in turn, provides motor command signals to the VFD 12 to produce the desired drive signals and control the motor. The speed monitoring interface unit 16 monitors the motor speed received from the tachometer 18, compares it against a motor speed profile, and signals an error if there is a sufficient discrepancy. The ride control computer 20 checks for the occurrence of particular combinations of signal values that are not expected if the motor 14 is properly following the speed profile. If an unexpected combination value persists beyond an acceptable time period that depends on the particular combination, then the control system 10 indicates a failure and halts operation of the motor. In this way, the control system ensures that the motor operates in accordance with the motor speed profile and does not exceed a safe speed, decelerates in a controlled, comfortable manner, and does not unexpectedly operate in reverse.

The motor 14 is used, for example, in an amusement park ride (not illustrated) and therefore safe, reliable operation is of extreme importance. The control system 10 increases the likelihood of safe operation by including a three-phase output contactor 22, which acts as a master on/off switch that can be opened to quickly disconnect the motor 14 from the VFD 12 and allow the ride vehicle to stop. The contactor 22 is closed by a combination of two signals, a command signal received from the ride control computer 20 over a power disconnect command line 24 and a power signal received from the VFD 12 over a contactor signal line 26. If either signal is absent, the contactor 22 will open. When the contactor is closed, it allows drive signals from the VFD 12 to be provided to windings 13 of the motor, which define the motor poles and which create a moving magnetic field that causes rotation of the rotor 15 of the motor. The contactor 22 produces a contactor monitor signal that is high when the contactor is closed and low when the contactor is open, and that is provided to the ride control computer 20 over a signal line 28.

The tachometer 18 determines the speed of the motor 14 and provides this data to the speed monitoring interface unit 16. In the preferred embodiment, the tachometer is an electronic tachometer, which is described in greater detail below, but alternatively can be a conventional tachometer, such as a mechanical tachometer attached to the shaft of the rotor 15. The speed data from the electronic tachometer comprises a pulse train that is provided to the speed monitoring interface unit 16, which compares the speed data against the motor speed profile and produces three speed monitor signals that are either high or low depending on whether the speed of the motor meets certain conditions. The signals, for example, can be 24-volt signals generated from contact switches.

The VFD 12 changes the speed of the motor 14 by changing the cycle time of signals it provides to the motor. Typically, the VFD will provide two running speeds, full speed and jog speed. Full speed is the normal maximum running speed of the motor and jog speed is used to intermittently operate the motor and, for example, park a ride vehicle. This allows the ride vehicle to be precisely positioned, such as during a parking maneuver. The VFD 12 provides the drive signals necessary for commanding full speed, jog speed, and ramping to and from these speeds. The VFD changes motor speed when it receives the command signals from the ride control computer 20. The command signals, for example, can be 24-volt signals provided by contact switches.

Figure 2:
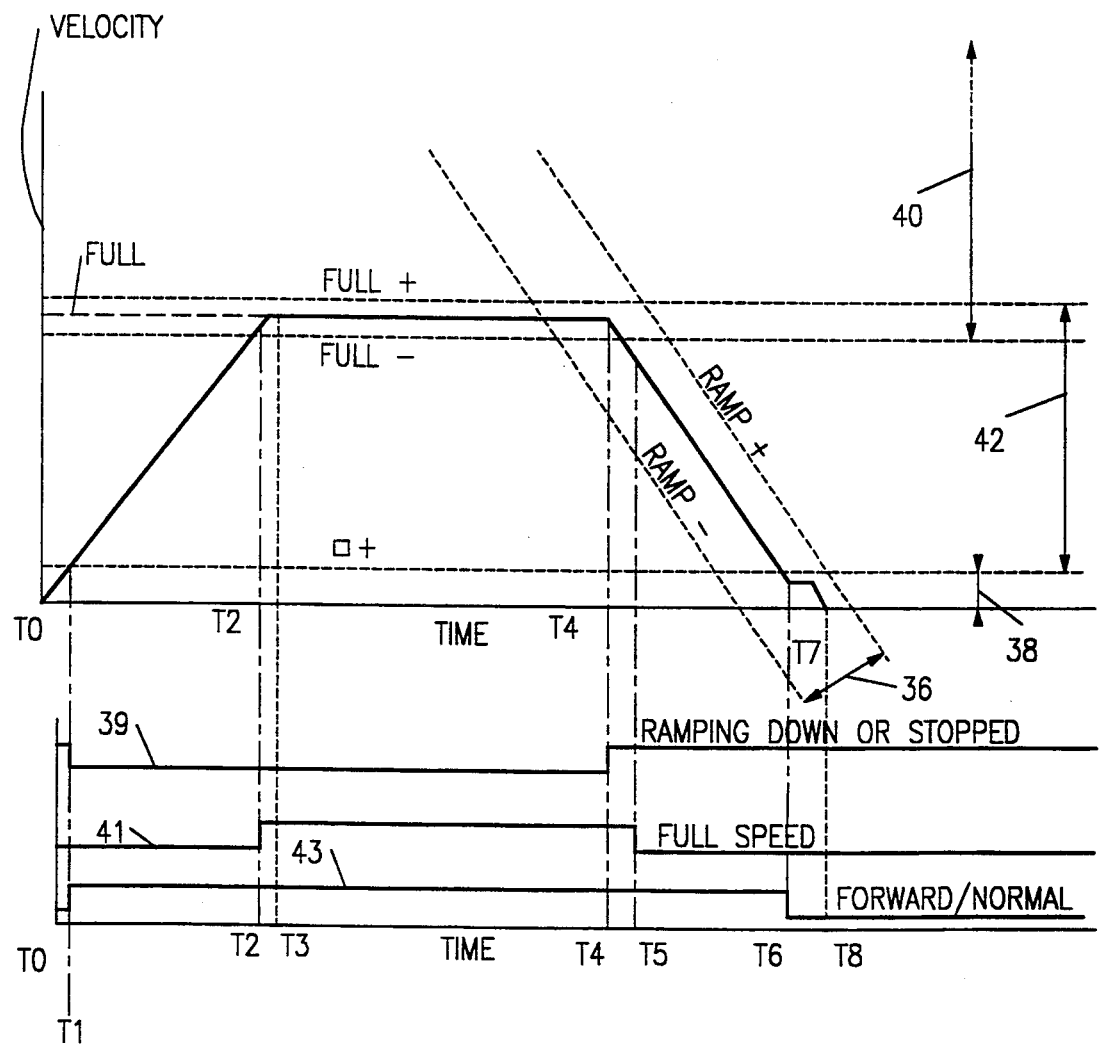
FIG. 2 is a graph that shows a typical motor speed profile for the motor illustrated in FIG. 1, along with the three status signals for the ride control computer.

The upper part of FIG. 2 shows a typical motor speed profile for the motor 14. The speed profile illustrates the desired motor speed for a given elapsed time after an initial time T0. From an initially stopped condition at time T0, the motor is commanded to its full speed and therefore the motor speed ramps up from zero at time T0 to full speed at time T3. After a time interval of operating at full speed, the motor is commanded to stop and therefore the motor speed ramps down from full speed at time T4 to motor stop at time TS. The precision with which the control system 10 operates is illustrated by the fact that the elapsed time from T4 to T8 for motor deceleration is approximately one second.

Error bounds are established for the speed of the motor 14 during the motor speed profile. The error bound for the full speed of the motor represents a range of acceptable speed above and below the full speed. The maximum acceptable full speed is designated in the FIG. 2 graph as "Full+" and the minimum acceptable full speed is designated as "Full−." The Full+ and Full− levels should be set such that when the motor 14 is cruising at full speed, any normal fluctuations or noise in the speed signal obtained from the tachometer 18 will stay within an acceptable range between Full+ and Full−. The acceptable range is typically quite narrow. For example, if the frequency of pulse-width signals provided by the VFD 12 is 60 Hz for the motor at full speed, then the maximum acceptable Full+ frequency is 62 Hz and the minimum acceptable Full− frequency is 58 Hz.

The error bound for a motor 14 to be moving and still considered stopped is designated "0+" and is set above absolute zero speed. The 0+ error bound exists because, before the motor actually reaches absolute zero speed, it reaches a speed that for all practical purposes is zero. A collision of the ride vehicle at or below the 0+ speed would cause no harm to the passengers. For example, using the full speed drive signal frequency of 60 Hz, the 0+ level is set to approximately 6 Hz. Preferably, the 0+ level is greater than the jog speed level (illustrated in the graph extending between time T6 and time T7) so that no out of bound indication will be generated when the motor is ramped down from any speed to jog speed and then to a stop.

An error bound for motor speed when the motor 14 is decelerating, or ramping down to zero, provides a deceleration corridor designated in FIG. 2 as "Ramp+" and "Ramp−" speed. The extent of the deceleration corridor will depend on the ride path and the nature of the ride, but is set to provide an acceptable deceleration of the ride vehicle.

Referring back to FIG. 1, the three status signals produced by the speed monitoring interface unit 16 comprise a Ramping-Down-or-Stopped monitor signal, a Full-Speed monitor signal, and a Forward/Normal-Speed monitor signal that are sent over signal lines 30, 32, and 34, respectively. The following table shows the states of these three signals and their respective meanings:

| SIGNAL 1 RAMP DOWN OR STOP | SIGNAL 2 FULL SPEED | SIGNAL 3 FORWARD NORMAL | MEANING |
| --- | --- | --- | --- |
| 0 | 0 | 0 | RUNNING IN REVERSE (REVERSE ERROR)* |
| 0 | 0 | 1 | RUNNING BELOW FULL SPEED |
| 0 | 1 | 0 | RUNNING TOO FAST (OVERSPEED ERROR)* |
| 0 | 1 | 1 | RUNNING FULL SPEED |
| 1 | 0 | 0 | STOPPED |
| 1 | 0 | 1 | RAMPING DOWN AND BELOW FULL SPEED |
| 1 | 1 | 0 | RAMPING DOWN AND RUNNING TOO FAST* |
| 1 | 1 | 1 | RAMPING DOWN AND AT FULL SPEED |

*error modes

The conditions for generating the speed monitoring signals are selected to maximize safety so that when the status signals indicate error conditions, described further below, they ensure that all possible motor speed and direction malfunctions are detected. For example, the three monitor signals are selected such that, at least once during the normal motor speed profile, each monitor signal should change state, or change from low to high. If one of the signals does not change state at all during the monitoring period, then an error is indicated by the ride control computer 20.

With reference to FIG. 2, when the speed of the motor 14 is within the deceleration corridor between Ramp+ and Ramp− speed and is ramping down to a stop, or is below the 0+ speed, then the Ramping-Down-or-Stopped monitor signal is on, or has a high value. When this monitor signal is high, it indicates that the motor is slowing down or is almost stopped. If the actual deceleration of the motor when decelerating is too shallow or is too steep, as dictated by the Ramp+ and Ramp− levels, respectively, then the Ramping-Down-or-Stopped monitor signal will be low. The range of motor speed values for this signal is illustrated by the arrows marked 36 and 38 and the corresponding signal 39 is indicated in the lower portion of FIG. 2.

The Full-Speed monitor signal is on, or is set to a high value, when the actual motor speed is greater than the Full− level. The range of motor speed values for this signal is represented in the upper part of FIG. 2 by the vertical arrow 40 and the corresponding signal 41 is indicated in the lower portion of FIG. 2. When this signal is high, it indicates that the motor 14 is running at or above its full speed.

The Forward/Normal-Speed monitor signal is set high when the motor speed is greater than the 0+ value and less than the Full+ speed value. The range of motor speed values for this signal is represented in the upper portion of FIG. 2 by the arrow 42 and the corresponding signal 43 is indicated in the lower portion of FIG. 2. When this signal is high, it indicates that the motor 14 is running in a forward direction and is not running above its full speed.

The speed monitoring interface unit 16 includes programming that is stored in non-volatile EPROM integrated circuits. The software in the speed monitoring interface unit generates these signals according to a precise methodology based on the information obtained from the tachometer 18, according to the signal that will be produced. For example, the Ramping-Down-or-Stopped monitor signal is determined by examining the velocity indicated from the tachometer as well as the rate of change of that velocity. In particular, if the velocity of the motor 14 is greater than or equal to an absolute stopped condition, and is less than or equal to the 0+ level, then the Ramping-Down-or-Stopped monitor signal is set high. If the motor velocity is negative, as is the case when the motor is running backwards, the Ramping-Down-or-Stopped monitor signal is set low. If the motor velocity is decreasing from any positive speed and is decreasing within the rates specified by the Ramp+ and Ramp− limits, then the Ramping-Down-or-Stopped monitor signal is set high. The speed monitoring interface unit 16 will analyze the speed data in the sequence listed above to determine whether the Ramping-Down-or-Stopped monitor signal should be set high or low. Therefore, if the motor velocity is decreasing but is negative, then the Ramping-Down-or-Stopped monitor signal will be properly set low.

Care is taken to provide a Ramping-Down-or-Stopped monitor signal whose output is steady. Thus, the speed monitoring interface unit 16 ensures that, if the motor 14 is at full speed, then the Ramping-Down-or-Stopped signal will remain low, even if there is noise on the speed signal from the tachometer 18. Moreover, when the motor begins ramping down to a stop, the Ramping-Down-or-Stopped monitor signal remains high, even with noise on the speed signal, until the motor speed reaches absolute zero. If the 0+ level is above the jog speed level, then this monitor signal remains high while the motor runs at jog speed. This is illustrated in the lower portion of FIG. 2, which shows that the Ramping-Down-or-Stopped monitor signal is set low when the motor speed is greater than 0+ at time T1 and is set high when ramping down beginning at time T4 through time T8.

The speed monitoring interface unit 16 sets the Full-Speed monitoring signal to a high value by examining the velocity of the motor 14 as provided by the tachometer 18. If the motor velocity is greater than or equal to the Full− level, then the Full-Speed monitoring signal is set high, and the signal is otherwise set low. Also, if the motor is running in reverse, the Full-Speed monitoring signal is set low.

The speed monitoring interface unit 16 produces the Forward/Normal-Speed monitor signal by examining the velocity of the motor 14. If the motor velocity is greater than or equal to the 0+ level and less than or equal to the Full+ level, then the Forward/Normal-Speed monitor signal is set high and otherwise is set low. Also, if the motor speed indicates the motor is running in reverse, then the Forward/Normal-Speed monitor signal is set low.

The ride control computer 20 operates according to a clock cycle and therefore receives updated signals at regular clock intervals. The ride control computer produces four command signals in response to the three status signals it receives from the speed monitoring interface unit 16 and in response to the Contactor monitor signal it receives from the contactor 22. Three of the command signals produced by the ride control computer are provided to the VFD 12 over signal lines 44, 46, and 48, and comprise a Motor Run command signal, a Motor Speed command signal, and an Emergency Stop command signal, respectively.

The Motor Run command signal is set high by the ride control computer 20 whenever the ride control computer determines that the VFD 12 should operate the motor 14. This is determined by comparing the state of the ride and operator inputs against the speed profile. The Motor Speed command signal selects the speed at which the motor will run, full speed or jog speed. The Motor Speed command signal is set high when the ride control computer wants the motor to run at full speed and is set low when it wants the motor to run at jog speed. The Emergency Stop command signal is set high at all times when the ride control computer determines that the motor 14 should be operated. The signal is low only when the ride control computer 20 wants the VFD 12 to perform an emergency deceleration to a complete stop. Finally, the Power Disconnect command signal is a fail-safe signal that closes the contactor 22 and enables the motor 14 to be driven by the VFD 12. If the signal is set low, the contactor is open and the motor 14 cannot run.

The ride control computer 20 selects combinations of command signals and monitor signals, checks their status against expected values, and halts operation if disagreement persists beyond a set time period by generating the Power Disconnect command signal. The ride control computer detects failure modes by using a programmable logic controller that implements in software, what are known to those skilled in the art as disagreement timers. In operation, at each point in the motor speed profile graph in the upper portion of FIG. 2 and for various predetermined combinations of the command signals and monitor signals, there is a correct state. Whenever a command signal/monitor signal combination is not in the correct state, they are said to disagree and the ride control computer 20 software will keep track of the time during which there is disagreement. If the time during which there is disagreement exceeds safe limits, i.e., if a particular disagreement timer is allowed to run for a sufficient period so that it reaches a predetermined elapsed time, different for each timer, then the ride control computer 20 indicates a failure and initiates a failure response, usually a shutdown of the motor 14. The ride control computer resets the elapsed time for each disagreement timer to zero whenever a particular command signal/monitor signal combination is in the correct state, or is in agreement.

In the preferred embodiment, the ride control computer 20 software implements nine disagreement timers. The first disagreement timer is referred to as the Failed-to-Run timer and is set to indicate a failure when the Motor Run command signal and Contactor monitor signal are in disagreement for the time it ordinarily takes the contactor 22 to close. The two signals are in disagreement, for example, when the Motor Run command signal is high and the Contactor monitor signal is low. The second disagreement timer is a Failed-to-Stop timer, and is set to indicate a failure when the Motor Run command signal is low and the Contactor monitor signal is high, and the signals are in this condition for the time it ordinarily takes the motor 14 to stop from full speed, plus the time it ordinarily takes the contactor 22 to open. The next disagreement timer is the Failed-to-Run-Forward disagreement timer and indicates a failure when the Motor Run command and Motor Speed command signals are high and the Forward/Normal monitor signal is low, and are in this condition for the time it ordinarily takes the motor to go from a stopped condition to the 0+ level.

The ride control computer 20 software implements a Failed-to-Run-Full-Speed disagreement timer that indicates a failure when the Motor Run command signal and Motor Speed command signal are high, the Full-Speed monitor signal is low, and the signals are in this condition for the time it ordinarily takes the motor 14 to ramp up to full speed. A Running-in-Reverse disagreement timer indicates a failure when the Ramping-Down-or-Stopped monitor signal, Full-Speed monitor signal, and Forward/Normal-Speed monitor signal are all low and remain in that condition for the maximum input update time for the ride control computer 20. A Running-Overspeed disagreement timer indicates a failure when the Full Speed monitor signal is high and the Forward/Normal-Speed monitor signal is low for the maximum input update time of the ride control computer. A Failed-to-Decelerate disagreement timer indicates a failure when the Motor Run command signal is high, the Motor Speed command signal is low, the Ramping-Down-or-Stopped monitor signal is low, and the signals remain in this condition for the maximum time ordinarily required for the tachometer 18 to indicate a ramping down condition. A Failed-to-Stop disagreement timer indicates a failure when the Motor Run command signal is low, the Forward/Normal-Speed monitor signal is high, and the signals are in this condition for the time it ordinarily takes the motor 14 to ramp down from full speed to the 0+ level. Finally, the ride control computer 20 software implements a Failed-to-Accelerate disagreement timer that indicates a failure when the Motor Run command signal, Full Speed command signal, and the Ramping-Down-or Stopped monitor signal are high, and the signals are in this condition for the time it ordinarily takes the motor 14 to ramp up to full speed.

The motor control system 10 described above advantageously provides safe and reliable control of motor speed with the inclusion of an electronic tachometer. In particular, the preferred embodiment includes an electronic tachometer 18 that does not require any moving parts and that reliably provides accurate speed information and is easily incorporated with the other elements of the motor control system discussed above. The electronic tachometer achieves these benefits by analyzing the current waveform in the windings of the motor 14.

Figure 3:
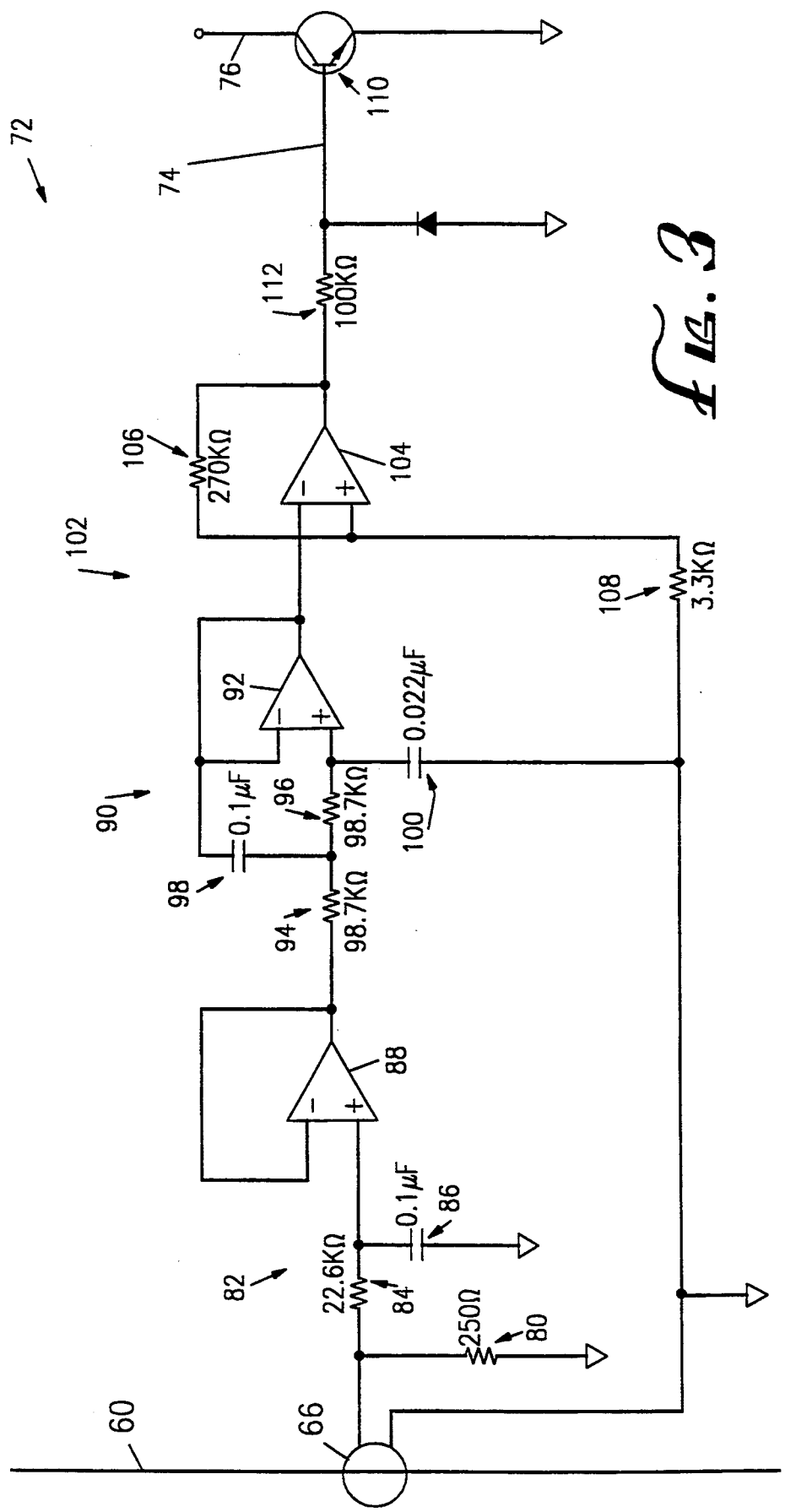
FIG. 3 is a schematic diagram of an electronic tachometer in accordance with the present invention, for use with the motor control system illustrated in FIG. 1.

Referring to FIGS. 1 and 3, in the preferred embodiment, the tachometer 18 is an electronic unit that detects the current in the stator wires 60, 62, and 64 of the motor 14 using current sensors 66, 68, and 70, respectively, analyzes the sensed current waveforms, and produces the motor velocity information. At least two motor phases must be detected to obtain the motor direction information that is used by the ride control computer 20. The components in connection with a single phase of the motor will be described, but it is to be understood that similar structure applies to the remaining phases.

The first current sensor 66 provides its sensed current to a tachometer signal processing block 72. No moving parts are required to convert the sensed current signals to speed data, and therefore the speed and direction of the motor can be determined reliably, inexpensively, and accurately.

The drive signals produced by the VFD 12 are characterized by a great deal of noise, including high frequency transients. Each of the current sensors 66, 68, and 70, which can be Hall-effect detectors, is coupled to a stator wire 60, 62, and 64, respectively, that carries current to one pole of the motor 14. The current signal is provided to the signal processing block 72, which produces a pulsed signal whose frequency corresponds to the frequency of the changing current in the stator. The pulsed signal is provided via an output line 74 to an open collector transistor output 76 and to the speed monitoring interface unit 16.

The speed monitoring interface unit 16 determines if the frequency of the speed signal, which corresponds to the speed of the motor 14, is within a predetermined range. For example, if the motor is used to drive an amusement park ride, the interface unit can determine if the speed of the ride is below Full+ and therefore is safe for the passengers. The monitor signals produced by the speed monitoring interface unit are provided to the ride control computer 20 as described above. The ride control computer then produces the command signals.

FIG. 3 illustrates one embodiment of the signal processing block 72, and shows the processing of the current signal from one of the Hall-effect detectors 66. In FIG. 3, the current signal from the detector 66 is provided to a resistor 80 connected to ground and also to the input of a passive low pass filter 82. The passive low pass filter is comprised of a resistor 84 and a capacitor 86 that are connected in series to ground. The positive input terminal of a non-inverting amplifier 88 is coupled between the resistor 84 and capacitor 86 of the passive low pass filter 82, with feedback to the negative input terminal of the non-inverting amplifier. The output of the non-inverting amplifier 88 is provided to a low-pass filter 90 comprising an amplifier 92 with a voltage divider network comprising a first resistor 94 and second resistor 96 connected to the positive input terminal of the amplifier 92, a capacitor 98 connected from between the first 94 and second 96 resistors to the negative input terminal of the amplifier 92, and a capacitor 100 connected from the positive input terminal to ground. Feedback is provided between the output and the inverting input of the amplifier 92. The non-inverting amplifier 88 and the low-pass filter 90 together provide a filtered current signal corresponding to one pole of the motor, with substantially all of the high-frequency transients removed. The non-inverting amplifier and low-pass filter can be used to remove, for example, frequency components greater than approximately 75 Hz.

After the current signal from a stator pole has been amplified and the high-frequency transients have been removed, the resulting signal is provided to a zero-crossing detector 102, which provides a pulsed signal with a transition at each zero crossing of the input signal. The zero crossing detector can be provided in the form of a comparator 104 with a feedback resistor 106 and a coupling resistor 108. The output of the zero crossing detector is provided to a transistor 110 via the output line 74. The zero crossing detector is coupled to the output line and transistor via a resistor 112. The transistor is in an open collector output configuration and provides an output signal to the speed monitoring interface 16 via the transistor output line 76. It is to be understood that the component values illustrated in FIG. 3 are exemplary only.

Although a motor control system can perform according to the scheme described above in connection with FIGS. 1 and 2 using a mechanical tachometer that provides a digital signal, the electronic tachometer described above provides superior reliability, and is not difficult for those skilled in the art to incorporate with control structures that must be provided for driving pulse-width modulation control motors.

Figure 4:
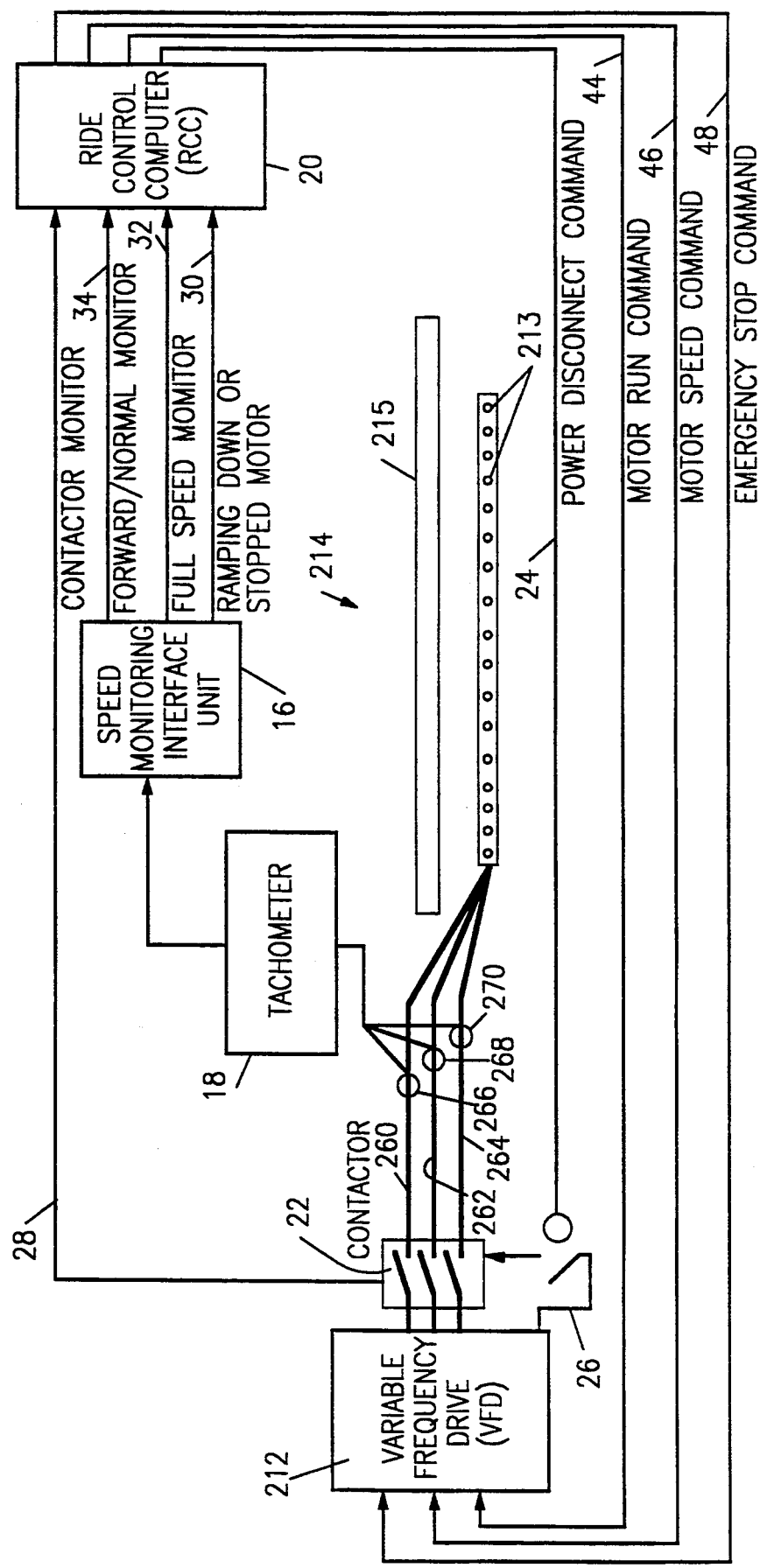
FIG. 4 is a block diagram of a motor control system constructed in accordance with the present invention and applied to a linear motor.

The motor control system described above can be adapted for use with a linear motor. FIG. 4 is a block diagram of a second embodiment and illustrates the motor control system of the invention adapted to a linear motor. Structures in FIG. 4 that are analogous to structures illustrated in FIG. 1 are identified by like reference numerals preceded by the numeral 2. Like reference numerals refer to like structures. FIG. 4 shows a linear motor 214 having a plurality of poles 213 arranged in a linear array adjacent to a movable reaction plate 215. A variable frequency drive (VFD) 212 supplies three-phase drive signals to the poles via wires 260, 262, and 264. A tachometer 18 detects the current in the motor wires 260, 262, and 264 by using current sensors 266, 268, and 270, respectively, and analyzes the sensed current waveforms to produce the motor velocity information. As with the embodiment illustrated in FIG. 1, the tachometer provides its speed information to the speed monitoring interface unit 16, which is coupled to the ride control computer 20. In all other respects, the linear motor 214 can be controlled to operate in the same fashion as described above in connection with the motor 14 illustrated in FIG. 1.

The present invention has been described above in terms of presently preferred embodiments so that an understanding of the present invention can be conveyed. There are, however, many configurations for motor control systems and tachometers not specifically described herein, but with which the present invention is applicable. The present invention should therefore not be seen as limited to the particular embodiments described herein, but rather, it should be understood that the present invention has applicability with respect to motor control systems and tachometers in a variety of applications. All modifications, variations, or equivalent arrangements that are within the scope of the attached claims should therefore be considered to be within the scope of the invention.

We claim:

1. A control system for regulating the speed of a motor having a rotatable rotor and windings that define poles of the motor, the control system comprising:
    a variable frequency drive that produces a drive signal that is provided to the windings of the motor to cause rotation of the rotor;
    speed means for providing a speed signal that indicates the actual speed of the rotor;
    monitor means for receiving the speed
    signal and generating monitor signals that indicate motor performance relative to a speed profile of desired :motor speed during operation of the motor; and
    control means for receiving the monitor signals and comparing the monitor signals with predetermined expected values, and for indicating a failure condition if an unexpected value is obtained and if the unexpected value persists for greater than a predetermined time interval.

2. A control system as defined in claim 1, wherein the monitor means generates monitor signals that indicate when the speed of the motor exceeds a minimum full speed, when the actual speed of the motor is below a maximum slow speed, and when the motor is properly decelerating.

3. A control system as defined in claim 1, wherein the control means generates command signals in response to the motor speed profile and the monitor signals, and wherein the command signals are provided to the variable frequency drive and determine the drive signal generated by the variable frequency drive.

4. A control system as defined in claim 3, wherein the control means restarts a timer count for an unexpected signal combination whenever the signal combination assumes an unexpected value.

5. A control system as defined in claim 4, wherein the monitor means generates monitor signals that indicate when the motor is exceeding a minimum full speed, when the motor is below a maximum slow speed, and when the motor is properly decelerating.

6. A control system as defined in claim 1, further including a contactor switch that connects and disconnects the motor from the drive signals produced by the variable frequency drive.

7. A control system as defined in claim 6, wherein the control means generates command signals in response to the motor speed profile and the monitor signals, and wherein the variable frequency drive receives the command signals and in response generates the drive signals, and the contactor switch receives the command signals and in response opens and closes.

8. A control system as defined in claim 7, wherein the monitor means generates monitor signals that indicate when the speed of the motor exceeds a minimum full speed, when the speed of the motor is below a maximum slow speed, and when the speed of the motor is within a decreasing ramp speed interval.

9. A control system as defined in claim 8, wherein the monitor means generates monitor signals comprising:
    a Ramping-Down-or-Stopped monitor signal that has a high value when the motor speed is within a decreasing ramp speed interval or when the motor speed is less than a maximum low speed, and has a low value otherwise;
    a Full-Speed monitor signal that has a high value when the motor speed is greater than a minimum Full-Speed and has a low value otherwise; and
    a Forward/Normal-Speed monitor signal that has a high value when the motor speed is greater than the maximum low speed value and is less than a maximum full speed value.

10. A control system as defined in claim 9, wherein the control means generates command signals that comprise:
    a Motor Run command signal that commands the variable frequency drive to generate motor drive signals;
    a Full-Speed command signal that is high when the control means determines that the motor should be driven at its full speed and has a low value when the control means determines that the motor should be driven at an intermittent speed;
    an Emergency Stop command signal that has a low value when the control means determines that the motor should be halted immediately, and has a high value when the control means determines that the motor should be provided with drive signals; and a Power-Disconnect command signal that is high when the control means determines that the motor should be provided with drive signals.

11. A control system as defined in claim 10, wherein the control means indicates a plurality of failure modes that comprise:
a Motor-Failed-to-Run failure mode that is indicated if the Motor Run command signal has a low value and Contactor monitor signal has a high value and if this combination persists for greater than a predetermined time interval;
a Motor-Failed-to-Stop failure mode that is indicated if the Motor Run command signal has a high value and the contactor monitor signal has a low value, and if this combination persists for greater than a predetermined time interval;
a Motor-Failed-to-Run failure mode that is indicated if the Motor Run command signal has a low value, the Full-Speed command signal has a low value, and the Forward/Normal-Speed monitor signal has a high value, and if this combination persists for greater than a predetermined time interval;
a Motor-Failed-to-Run-Full-Speed failure mode that is indicated if the Motor Run command signal has a low value, the Full-Speed command signal has a low value, and the Full-Speed monitor signal has a high value, and if this combination persists for greater than the time ordinarily necessary for the motor to reach full speed from a stopped condition;
a Motor-Running-in-Reverse failure mode that is indicated if the Ramping-Down-or-Stopped monitor signal has a high value, the Full-Speed monitor signal has a high value, and the Forward/Normal-Speed monitor signal has a high value, and if this combination persists for greater than a predetermined input update time for the control means;
a Motor-Running-Overspeed failure mode that is indicated if the Full-Speed monitor signal has a low value and the Forward/Normal-Speed monitor signal has a high value, and if this condition persists for greater than an input update time interval for the control means;
a Motor-Failed-to-Decelerate failure mode that is indicated if the Motor Run command signal has a low value, the Full-Speed command signal has a high value, and the Ramping-Down-or-Stopped monitor signal has a high value, and if this combination of values persists for a time interval greater than is necessary for the speed means to indicate a reduction in motor speed from its full speed to its low speed;
a Motor-Failed-to-Stop failure mode that is indicated if the Motor Run command signal is high and the Forward/Normal-Speed monitor signal is low, and if this combination of values persists for greater than a predetermined time interval in which the motor ordinarily can decrease from its full speed to its low speed; and
a Motor-Failed-to-Accelerate failure mode that is indicated if the Motor Run command signal is low, the Full-Speed command signal is low, and the Ramping-Down-or-Stopped monitor signal is low, and if this combination of values persists for a time interval greater than the time it ordinarily takes for the motor to ramp up to full speed.

12. A control system as defined in claim 1, wherein the speed means comprises an electronic tachometer including:
signal means for producing a current signal that corresponds to the current in at least one pole of the motor;
filter means for removing frequency components of the current signal greater than a predetermined maximum value of the motor speed profile to provide a filtered signal; and
pulse means for providing a pulse signal that indicates the frequency of the filtered signal.

13. A control system as defined in claim 12, wherein the filter means comprises a low-pass filter that filters out frequency components greater than approximately 75 Hz.

14. A control system as defined in claim 13, wherein the low-pass filter includes resistive and capacitive elements coupled to an amplifier element.

15. A control system as defined in claim 12, wherein the pulse means comprises a zero-crossing detector that produces a transition at each zero-crossing of the filtered signal.

16. A control system as defined in claim 15, wherein the zero-crossing detector comprises a resistive element coupled to an operational amplifier.

17. A control system as defined in claim 12, wherein the signal means comprises a current sensor that is coupled to one pole of the motor.

18. A control system for regulating the speed of a motor, comprising:
an electronic tachometer coupled to the motor, said electronic tachometer producing a tachometer output that represents the speed of the motor;
a monitor that receives said tachometer output and stores in memory a motor speed profile that represents desired motor speed during operation of the motor, said monitor comparing said tachometer output with said motor speed profile, and producing an error signal if a difference between said tachometer output and said motor speed profile exceeds predetermined expected values; and,
a timer coupled to receive said error signal and that indicates a failure condition if an unexpected value is obtained and persists for greater than a predetermined time interval.

19. A control system according to claim 18, wherein:
the motor has a rotor that rotates relative to windings that define poles of the motor;
said electronic tachometer includes
a detector coupled to one of the windings so as to produce a varying electronic signal representative of the motor's phase, and,
a pulse circuit that is coupled to said detector to receive said varying electronic signal and that produces said tachometer output as a pulsed output signal having a first state when said varying electronic signal matches a predefined one of a voltage and current level and a different state when said varying electronic signal does not match said predefined one;
said monitor determines the speed of the motor in dependence upon the frequency with which said tachometer output has said first state.

20. A control system for regulating the speed of a motor having a rotatable rotor and windings that define poles of the motor, said control system comprising:
a variable frequency drive that produces a drive signal that is provided to the windings of the motor to cause rotation of the motor;

a computer that controls operation of said variable frequency drive to run, accelerate, decelerate the motor within a predetermined motor speed profile;

an electronic tachometer that electronically taps at least two windings of the motor and that produces at least one pulsed output signal that represents change of polarity of current of a phase of the motor and at least one output signal that indicates direction of rotation of the rotor; and control logic, coupled to receive said output signals from said electronic tachometer, that stores in memory a motor speed profile that represents desired motor speed during operation of the motor, including error bounds for each of desired acceleration and deceleration, compares motor speed to said motor speed profile that represents desired motor speed during operation of the motor, produces an error signal if a difference between said tachometer output and said motor speed profile exceeds said error bounds, and, indicates a failure condition an unexpected value is obtained and persists greater than a predetermined time interval.

* * * * *

UNITED STATES PATENT AND TRADEMARK OFFICE
CERTIFICATE OF CORRECTION

PATENT NO. : 5,349,276
DATED : September 20, 1994
INVENTOR(S) : Mezzatesta, Jr. et al.

It is certified that error appears in the above-identified patent and that said Letters Patent is hereby corrected as shown below:

Col. 11, line 58: ":motor." should be -- motor --.

Col. 16, line 10: "condition an" should be -- condition if an --

Signed and Sealed this

Twentieth Day of December, 1994

Attest:

BRUCE LEHMAN

Attesting Officer        Commissioner of Patents and Trademarks